US007113944B2

(12) United States Patent
Zhang et al.

(10) Patent No.: US 7,113,944 B2
(45) Date of Patent: Sep. 26, 2006

(54) RELEVANCE MAXIMIZING, ITERATION MINIMIZING, RELEVANCE-FEEDBACK, CONTENT-BASED IMAGE RETRIEVAL (CBIR).

(75) Inventors: Hong-Jiang Zhang, Beijing (CN); Zhong Su, Beijing (CN); Xingquan Zhu, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 38 days.

(21) Appl. No.: 11/042,456

(22) Filed: Jan. 25, 2005

(65) Prior Publication Data

US 2005/0131951 A1   Jun. 16, 2005

Related U.S. Application Data

(63) Continuation of application No. 10/832,501, filed on Apr. 26, 2004, which is a continuation of application No. 09/823,534, filed on Mar. 30, 2001, now Pat. No. 6,748,398.

(51) Int. Cl.
   *G06F 17/30* (2006.01)

(52) U.S. Cl. ............ 707/5; 707/2; 707/3; 707/10; 707/104.1; 707/102

(58) Field of Classification Search .............. 707/5, 707/2–3, 102, 104.1; 345/835; 356/138
See application file for complete search history.

(56) References Cited

U.S. PATENT DOCUMENTS

| | | | |
|---|---|---|---|
| 5,442,778 A * | 8/1995 | Pedersen et al. ............ 707/5 |
| 5,619,709 A | 4/1997 | Caid et al. | |
| 5,751,286 A * | 5/1998 | Barber et al. ............ 715/835 |
| 5,855,015 A | 12/1998 | Shoham | |
| 5,873,056 A | 2/1999 | Liddy et al. | |
| 5,889,506 A | 3/1999 | Lopresti et al. | |
| 5,893,095 A | 4/1999 | Jain et al. | |
| 5,899,999 A | 5/1999 | De Bonet | |
| 5,987,457 A | 11/1999 | Ballard | |
| 6,020,955 A * | 2/2000 | Messina ............ 356/138 |
| 6,038,560 A | 3/2000 | Wical | |
| 6,094,652 A | 7/2000 | Faisal | |
| 6,134,532 A | 10/2000 | Lazarus et al. | |
| 6,175,829 B1 | 1/2001 | Li et al. | |
| 6,189,002 B1 | 2/2001 | Roitblat | |
| 6,282,549 B1 | 8/2001 | Hoffert et al. | |
| 6,304,864 B1 | 10/2001 | Liddy et al. | |
| 6,311,194 B1 | 10/2001 | Sheth et al. | |

(Continued)

OTHER PUBLICATIONS

Z. Chen et al., "Web Mining for Web Image Retrieval" Journal of the American Society for Information Science and Technology 52(10) 15 pages, Aug. 2001.

(Continued)

*Primary Examiner*—Safet Metjahic
*Assistant Examiner*—Sana Al-Hashemi
(74) *Attorney, Agent, or Firm*—Lee & Hayes, PLLC

(57) ABSTRACT

An implementation of a technology, described herein, for relevance-feedback, content-based facilitating accurate and efficient image retrieval minimizes the number of iterations for user feedback regarding the semantic relevance of exemplary images while maximizing the resulting relevance of each iteration. One technique for accomplishing this is to use a Bayesian classifier to treat positive and negative feedback examples with different strategies. In addition, query refinement techniques are applied to pinpoint the users' intended queries with respect to their feedbacks. These techniques further enhance the accuracy and usability of relevance feedback. This abstract itself is not intended to limit the scope of this patent. The scope of the present invention is pointed out in the appending claims.

8 Claims, 6 Drawing Sheets

U.S. PATENT DOCUMENTS

| | | | |
|---|---|---|---|
| 6,345,274 B1 * | 2/2002 | Zhu et al. | 707/5 |
| 6,347,313 B1 | 2/2002 | Ma et al. | |
| 6,510,406 B1 | 1/2003 | Marchisio | |
| 6,523,026 B1 | 2/2003 | Gillis | |
| 6,553,385 B1 | 4/2003 | Johnson et al. | |
| 6,567,797 B1 * | 5/2003 | Schuetze et al. | 707/2 |
| 6,675,159 B1 | 1/2004 | Lin et al. | |
| 6,687,696 B1 | 2/2004 | Hofmann et al. | |
| 6,760,714 B1 | 7/2004 | Caid et al. | |
| 6,766,316 B1 | 7/2004 | Caudill et al. | |
| 6,766,320 B1 | 7/2004 | Wang et al. | |
| 2002/0038299 A1 | 3/2002 | Zernik et al. | |
| 2002/0194200 A1 | 12/2002 | Flank et al. | |
| 2003/0028512 A1 | 2/2003 | Stensmo | |
| 2004/0111408 A1 | 6/2004 | Caudill et al. | |

OTHER PUBLICATIONS

R. Agrawal, et al., "Fast Discovery of Association Rules, " In Advances in Knowledge Discovery and Data Mining, Fayyad Um, Piatetsky-Shaprio G. Smyth P & Uthurusamy R. (eds). AAAI Press, Menlo Park, California, (1994), pp. 307-328.

J. Allen, "Natural Language Understanding," University of Rochester, 1994, pp. 23-25.

D. Bikel, et al., "Nymble: A High-Performance Learning Name-Finder," Proc. of the Fifth Conference on Applied Natural Language Processing, Association of Computational Linguistics, 1997, pp. 194-201.

M. Flickner et al., "Query by Image and Video Content: The QBIC System," IEEE Computer, Sep. 1995, pp. 23-32.

D. Harman, et al., "Inverted Files," Information Retrieval; Data Structures and Algorithms, Frakes WB and Baeza-Yates R (eds), 1992, Chapter 3, Prentice Hall, NY.

E. Horvitz et al., The Lumiere Project: Bayesian User Modeling for Inferring the Goals and Needs of Software Users: Proc. of the 14th Conference on Uncertainty in Articial Intelligence, 1998.

T. Joachims, "A Probablistic Analysis of the Rocchio Algorithm with TFIDF for Text Categorization", in Proc. of the 14th International Conference on Machine Learning, Nashville, TN, Jul. 1997, pp. 143-151. Morgan Kaufmann Publisher, San Francisco, CA.

J-H Kim, et al., "A Rule-Based Named Entity Recognitioin System for Speech Input," in Proc. of the Sixth International Conference on Spoken Language Processing, 2000, vol. 1, pp. 528-531.

N. Kosugi, et al., "Practical Query-By-Humming System" Proc. of the 8th ACM International Conference on Multimedia, 2000, pp. 333-342.

Y. Lu et al., "A Unified Framework for Semantics and Feature Based Relevance Feedback in Image Retrieval Systems," Proc. of the 8th ACM International Conference on Multimedia, 2000, pp. 31-38.

T. M. Mitchell, "Machine Learning," 1997, pp. 176-183, McGraw-Hill.

M. F. Porter, "An Algorithm of Suffix Stripping," Program, vol. 14, No. 3, pp. 130-137, Jul. 1980.

C. J. van Rijsbergen, "Information Retrieval," Butterworths, Department of Computing Science, University of Glasgow, 1979.

Shen et al., "Giving Meanings to WWW Images", Proc. of the 8th ACM International Conference on Multimedia, 2000, pp. 39-48.

Gong, et al., "An Image Database System with Content Capturing and Fast Image Indexing Abilities," Proceedings of IEEE International Conference on Multimedia Computing and Systems, 1994, pp. 121-130.

A. Ono, A Flexible Content-Based Image Retrieval System with Combined Scene Description Keywork, Proceedings of IEEE International Conference on Multimedia Computing and Systems, 1996, pp. 201-208.

Zhang et al., "A Scheme of Visual Feature Based Image Indexing," To appear in SPIE Conference on Storage and Retrieval for Image and Video Databases, San Jose, CA, Feb. 1995, pp. 1-12.

* cited by examiner

RELEVANCE MAXIMIZING, ITERATION MINIMIZING, RELEVANCE-FEEDBACK, CONTENT-BASED IMAGE RETRIEVAL (CBIR).

RELATED APPLICATIONS

This application is a continuation of U.S. patent application Ser. No. 10/832,501, filed Apr. 26, 2004, which is a continuation of U.S. patent application Ser. No. 09/823,534, filed Mar. 30, 2001, which issued on Jun. 8, 2004 as U.S. Pat. No. 6,748,398. This application claims priority to U.S. patent application Ser. No. 09/823,534, filed Mar. 30, 2001. These patent application Ser. Nos. 10/832,501 and 09/823,534 are incorporated herein by reference.

TECHNICAL FIELD

This invention generally relates to a technology facilitating accurate and efficient image retrieval.

BACKGROUND

Digital images are increasingly more common as scanners and digital cameras drop in price and increase in availability and function. As digital photographers (amateurs and professionals alike) amass large collections of digital photographs on their computers, the challenges involved with organizing, querying, and accessing digital images grow.

Therefore, digital photographers need to utilize "image retrieval" technology to accomplish their tasks. "Image retrieval" refers to a technology focused on the organization of a library of digital images, the inquiry into such a library, and the retrieval of selected images that meet the terms of such inquiry.

Images in a library may be organized and, thus, retrieved in an organized fashion based upon their content. Content-based categorization and image retrieval approaches are beneficial to all those with access to a library of digital images.

Image Retrieval Systems

Automatic image retrieval systems provide an efficient way for users to navigate through the growing numbers of available images. Traditional image retrieval systems allow users to retrieve images in one of two ways: (1) keyword-based image retrieval or (2) content-based image retrieval.

Keyword-Based. Keyword-based image retrieval finds images by matching keywords from a user query to keywords that have been manually added to the images. Thus, these images have been manually annotated with keywords related to their semantic content. One of the more popular collections of annotated images is "Corel™ Gallery", an image database from Corel Corporation that includes upwards of one million annotated images.

Unfortunately, with keyword-based image retrieval systems, it can be difficult or impossible for a user to precisely describe the inherent complexity of certain images. As a result, retrieval accuracy can be severely limited because some images—those that cannot be described or can only be described ambiguously—will not be retrieved successfully. In addition, due to the enormous burden of manual annotation, there are a limited number of databases with annotated images.

Although image retrieval techniques based on keywords can be easily automated, they suffer from the same problems as the information retrieval systems in text databases and web-based search engines. Because of wide spread synonymy and polysemy in natural language, the precision of such systems is very low and their recall is inadequate. (Synonymy is the quality of being synonymous; equivalence of meaning. Polysemy means having or characterized by many meanings.) In addition, linguistic barriers and the lack of uniform textual descriptions for common image attributes severely limit the applicability of the keyword based systems.

Content-Based. Content-based image retrieval (CBIR) systems have been built to address many issues, such as those of keyword-based systems. These systems extract visual image features such as color, texture, and shape from the image collections and utilize them for retrieval purposes. These visual image features are also called "low-level" features. Examples of low-level features of an image include color histogram, wavelet based texture descriptors, directional histograms of edges, and so forth.

CBIR systems work well when the extracted feature vectors accurately capture the essence of the image content. For example, if a user is searching for an image with complex textures having a particular combination of colors, this type of query is extremely difficult to describe using keywords, but it can be reasonably represented by a combination of color and texture features. On the other hand, if a user is searching for an object that has clear semantic meanings but cannot be sufficiently represented by combinations of available feature vectors, the content-based systems will not return many relevant results. Furthermore, the inherent complexity of the images makes it almost impossible for users to present the system with a query that fully describes the their intentions.

Although CBIR solves many of the problems of keyword-based image retrieval, it has its own shortcomings. One such shortcoming is that searches may return entirely irrelevant images that just happen to possess similar features. Additionally, individual objects in images contain a wide variety of low-level features. Therefore, using only the low-level features will not satisfactorily describe what is to be retrieved.

Semantic Concepts. The user is typically looking for specific semantic concepts rather than specific low-level features. However, there is a disparity between "semantic concepts" and "low-level image features." This disparity limits the performance of CBIR systems. Semantic concepts include meaningful content of an image—for example, a river, a person, a car, a boat, etc. Although objectively measurable, low-level image features lack specific meaning.

The mapping between semantic concepts and low-level features is still impractical with present computer vision and AI techniques. To improve this situation, more research efforts have been shifted to "relevance feedback" techniques recently.

Relevance-Feedback CBIR

A common type of a CBIR system is one that finds images that are similar to low-level features of an example image or example images. To weed out the irrelevant images returned in CBIR, some CBIR systems utilize user feedback to gain an understanding as to the relevancy of certain images. The user feedback is in the form of selected exemplary images (either positive or negative). These exemplary images may be called "feedback" images.

The user feedback selects the exemplary images used to narrow successive searches. A common approach to relevance feedback is estimating ideal query parameters using the low-level image features of the exemplary images. Thus, relevance feedback maps low-level features to human recognition of semantic concepts.

In a relevance-feedback CBIR system, a user submits a query and the system provides a set of query results. More specifically, after a query, the system presents a set of images to the human querier. The human designates specific images as positive or negative. Positive indicates that the image contains the semantic concepts queried and negative indicates that the image does not contain such concepts.

Based upon this feedback, the system performs a new query and displays a new set of resulting images. The human again provides feedback regarding the relevance of the displayed images. Another round of query and feedback is performed. Each round may be called an iteration. The process continues for a given number of iterations or until the user (or system) is satisfied with the overall relevance of the present set of images.

One of the most popular models used in information retrieval is the vector model. The vector model is described in such writings as Buckley and Salton, "Optimization of Relevance Feedback Weights," in Proc of SIGIR'95; Salton and McGill, "Introduction to Modern Information Retrieval," McGraw-Hill Book Company, 1983; and W. M. Shaw, "Term-Relevance Computation and Perfect Retrieval Performance," Information processing and Management. Various effective retrieval techniques have been developed for this model and among them is the method of relevance feedback.

Most of the existing relevance feedback research can be classified into two approaches: query point movement and re-weighting.

Query-Point-Movement

The query-point-movement method essentially tries to improve the estimate of an "ideal query point" by moving it towards good example points and away from bad example points. The frequently used technique to iteratively improve this estimation is the Rocchio's equation given below for sets of relevant documents $D'_R$ and non-relevant documents $D'_N$ noted by the user:

$$Q' = \alpha Q + \beta \left( \frac{1}{N_{R'}} \sum_{i \in D'_R} D_i \right) - \gamma \left( \frac{1}{N_{N'}} \sum_{i \in D'_N} D_i \right) \quad (1)$$

where $\alpha$, $\beta$, and $\gamma$ are suitable constants and $N_{R'}$ and $N_{N'}$ are the number of documents in $D'_R$ and $D'_N$ respectively. In this equation, $D'_R$ are those images (i.e., documents) that the user found relevant and $D'_N$ are those images that the user did not find relevant.

The first portion (before the subtraction sign) of Equation 1 is a "reward function" that rewards query results that include the desired semantic content. The reward is based upon the positive feedback from the querier. The last portion (after the subtraction sign) of Equation 1 is a "penalty function" that penalizes query results that do not include the desired semantic content. The penalty is based upon the negative feedback from the querier.

This technique is employed, for example, by the MARS system, as described in Rui, Y, Huang, T. S., and Mehrotra, S. "Content-Based Image Retrieval with Relevance Feedback in MARS," in Proc. IEEE Int. Conf. on Image proc., 1997.

Some existing implementations of point movement strategy use a Bayesian method. Specifically, these include Cox et al. (Cox, I. J., Miller, M. L., Minka, T.P., Papathornas, T. V., Yianilos, P. N. "The Bayesian Image Retrieval System, PicHunter: Theory, Implementation, and Psychophysical Experiments" IEEE Tran. On Image Processing, Volume 9, Issue 1, pp. 20–37, January 2000) and Vasconcelos and Lippman (Vasconcelos, N., and Lippman, A., "A Bayesian Framework for Content-Based Indexing and Retrieval", In: Proc. of DCC'98, Snowbird, Utah, 1998) used Bayesian learning to incorporate user's feedback to update the probability distribution of all the images in the database.

In these conventional works, they consider the feedback examples to the same query to be independent with each other. They do this so that they can use Naive Bayesian Inference to optimize the retrieval results by using feedback examples.

These conventional works do not treat all positive examples to be closely is related with each other. They do not use all these positive examples of the same query to construct a Bayesian classifier and use that classifier to represent the original query and try to get more accurate retrieval results. These works are not incremental.

Re-Weighting

With the re-weighting method, each image is represented by an N dimensional feature vector; thus, the image may be viewed as a point in an N dimensional space. Therefore, if the variance of the good examples is high along a principle axis j, the values on this axis are most likely not very relevant to the input query and a low weight $w_j$ can be assigned to the axis. Therefore, the inverse of the standard deviation of the $j^{th}$ feature values in the feature matrix is used as the basic idea to update the weight $w_j$. The MARS system mentioned above implements a slight refinement to the re-weighting method called the standard deviation method.

To optimize the query for further image similarity assessment, conventional relevance-feedback systems use only weighted feature sum (WFS) of the feedback images. WFS is a conventional query-refinement technique. WFS requires many iterations (well more than three) to produce adequate results. WFS does not work very well in many cases, particularly when the user wants to express an "OR" relationship among the queries.

Multiple Iterations

Conventional relevance feedback techniques may require many iterations before the majority of these results include images with the desired semantic content. They require at least three iterations, but typically much more than three iterations, before generating results with the desired semantic content.

These conventional relevance feedback methods either have no strategy to progressively adjust their results or have bad performances on large datasets. With conventional relevance feedback methods, the positive and negative feedbacks are always treated as the same processes.

SUMMARY

Described herein is a technology for relevance-feedback, content-based facilitating accurate and efficient image retrieval. More specifically, the technology minimizes the number of iterations for user feedback regarding the semantic relevance of exemplary images while maximizing the resulting relevance of each iteration.

One technique for accomplishing this is to use a Bayesian classifier to treat positive and negative feedback examples with different strategies. A Bayesian classifier determines the distribution of the query space for positive examples. Images near the negative examples are penalized using a 'dibbling' process. This technique utilizes past feedback information for each iteration to progressively improve results.

In addition, query refinement techniques are applied to pinpoint the users' intended queries with respect to their feedbacks. These techniques further enhance the accuracy and usability of relevance feedback.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

The following description sets forth specific embodiments of a relevance maximizing, iteration minimizing, relevance-feedback, content-based image is retrieval (CBIR) that incorporate elements recited in the appended claims. These embodiments are described with specificity in order to meet statutory written description, enablement, and best-mode requirements. However, the description itself is not intended to limit the scope of this patent.

Described herein are one or more exemplary implementations of a relevance maximizing, iteration minimizing, relevance-feedback, content-based image retrieval (CBIR). The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a relevance maximizing, iteration minimizing, relevance-feedback, content-based image retrieval (CBIR) may be referred to as an "exemplary RFCBIR."

Incorporation by Reference

The following co-pending patent applications, filed on Oct. 30, 2000, and assigned to the Microsoft Corporation, are incorporated by reference herein:

U.S. patent application Ser. No. 09/702,292, entitled "Image Retrieval Systems and Methods with Semantic and Feature Based Relevance Feedback";

U.S. patent application Ser. No. 09/702,288, entitled "Semi-Automatic Annotation of Multimedia Objects".

Introduction

Figure 1:
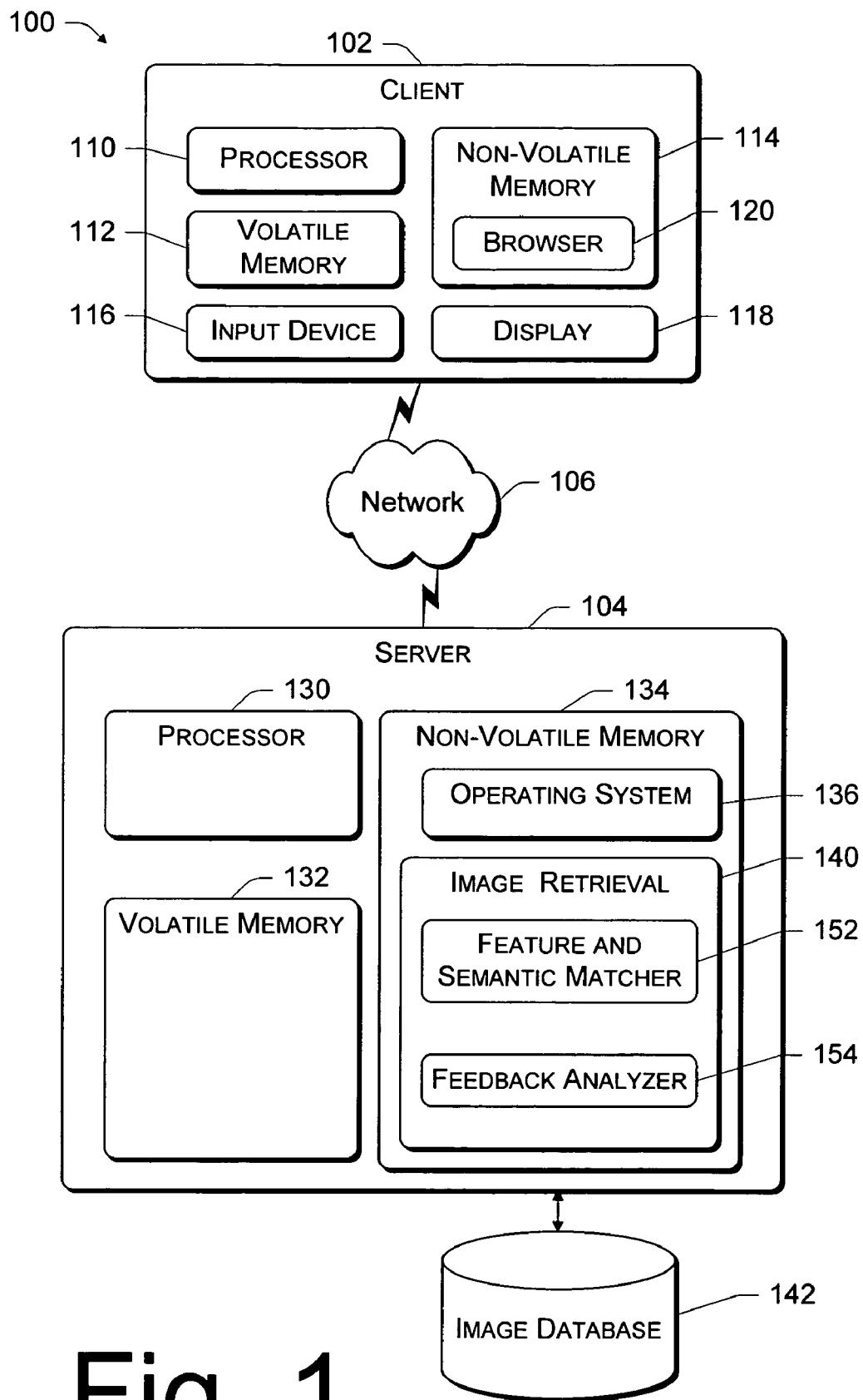
FIG. 1 is a block diagram of an exemplary computer network in which a server computer implements an image retrieval system (in accordance with an implementation of the claimed invention) that may be accessed over a network by one or more client computers.
Figure 6:
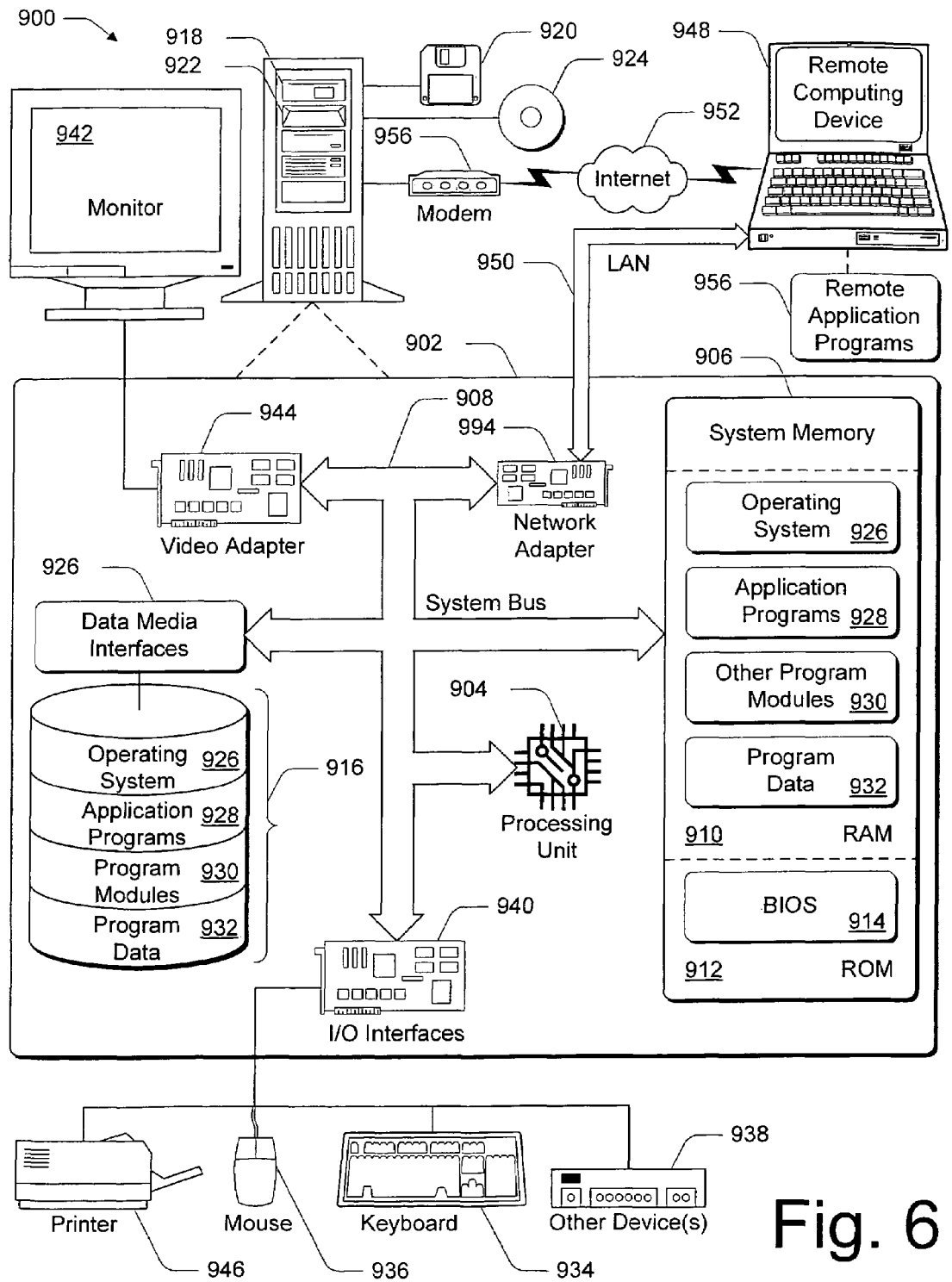
FIG. 6 is an example of a computing environment capable of implementing an implementation (wholly or partially) of the invention claimed herein.

The one or more exemplary implementations, described herein, of the present claimed invention may be implemented (whole or in part) by a RFCBIR system and/or by a computing environment like that shown in FIG. 1 or 6.

The exemplary RFCBIR is a relevance-feedback CBIR system that minimizes query-results iterations and maximizes the resulting relevancy of the results of each iteration.

One implementation of the exemplary RFCBIR employs a new relevance-feedback approach based on Bayesian classifier and it treats positive and negative feedback examples with different strategies. For positive examples (i.e., images that include desired semantic content as determined by the relevance feedback of a human), a Bayesian classifier is used to determine the distribution of the query space. For negative examples, a 'dibbling' process is applied to penalize images that are near the negative examples in the query and retrieval refinement process. This implementation has a progressive learning capability that utilize past feedback information to help the current query.

Other implementations of the exemplary RFCBIR employ at least one of three query-refinement techniques (or a combination of such techniques) to evaluate the similarity between images in database and feedback images. Each of the three query-refinement techniques gives better results than the conventional WFS technique. The three techniques described herein include: weighted distance sum (WDS), minimal distance (MD), and minimum distance rank (MDR). Experimental comparisons show that the MDR technique gives the best results in multiple images query system. These techniques may be combined.

Herein, the architecture of the exemplary RFCBIR is described in the context of an Internet-based system in which a server hosts the image retrieval system and clients submit user queries to the server. However, the architecture may be implemented in other environments. For instance, the image retrieval architecture may be implemented in non-Internet-based client-server systems or on a non-networked computer system.

Exemplary Computing Environment

FIG. 1 shows an exemplary computer network system 100 in which the RFCBIR system may be implemented. The network system 100 includes a client computer 102 that submits queries to a server computer 104 via a network 106, such as the Internet. While the RFCBIR system can be implemented using other networks (e.g., a wide area network or local area network) and should not be limited to the Internet, the RFCBIR system will be described in the context of the Internet as one suitable implementation. The web-based retrieval system allows multiple users to perform retrieval tasks simultaneously at any given time.

The client 102 is representative of many diverse computer systems, including general-purpose computers (e.g., desktop computer, laptop computer, etc.), network appliances (e.g., set-top box (STB), game console, etc.), and the like. The client 102 includes a processor 110, a volatile memory 112 (e.g., RAM), and a non-volatile memory 114 (e.g., ROM, Flash, hard disk, optical, etc.). The client 102 also has one or more input devices 116 (e.g., keyboard, keypad, mouse, remote control, stylus, microphone, etc.) and a display 118 to display images returned from the image retrieval system.

The client 102 is equipped with a browser 120, which is stored in non-volatile memory 114 and executed on processor 110. The browser 120 submits requests to and receives responses from the server 104 via the network 106. For discussion purposes, the browser 120 may be configured as a conventional Internet browser that is capable of receiving and rendering documents written in a markup language, such as HTML (hypertext markup language). The browser may further be used to present the images on the display 118.

The server 104 is representative of many different server environments, including a server for a local area network or wide area network, a backend for such a server, or a Web server. In this latter environment of a Web server, the server 104 may be implemented as one or more computers that are configured with server software to host a site on the Internet 106, such as a Web site for searching.

The server 104 has a processor 130, volatile memory 132 (e.g., RAM), and non-volatile memory 134 (e.g., ROM, Flash, hard disk, optical, RAID memory, etc.). The server 104 runs an operating system 136 and an image retrieval system 140. For purposes of illustration, operating system 136 and image retrieval system 140 are illustrated as discrete blocks stored in the non-volatile memory 134, although it is recognized that such programs and components reside at various times in different storage components of the server 104 and are executed by the processor 130. Generally, these software components are stored in non-volatile memory 134 and from there, are loaded at least partially into the volatile main memory 132 for execution on the processor 130.

The image retrieval system 140 searches for images stored in image database 142. The image retrieval system 140 includes a query handler (not is shown), a feature and semantic matcher 152, and a feedback analyzer 154.

Typically, the query handler handles the initial queries received from the client 102. Such initial queries may be in the form of natural language queries, individual word queries, or image queries that contains low-level features of an example image that forms the basis of the search. Depending on the query type, the query handler initiates a feature-based search of the image database 142. After the initial query, user feedback is available; therefore, the query handler is not necessary after the initial query.

The feature and semantic matcher 152 searches for images in image database 142 that contain low-level features resembling the example image(s). The feature and semantic matcher 152 rank the images according to their relevance to the query and return the images in rank order for review by the user. Via a user interface, the user can mark or otherwise identify individual images as more relevant to the query or as less or not relevant to the query.

The feedback analyzer 154 monitors the user feedback and analyzes which images are deemed relevant to the search and which are not. In other words, based upon user's feedback, it specifies which images represent positive feedback and which represent negative feedback.

The feedback analyzer 154 uses the relevance feedback to narrow the search for relevant images. In other words, the feedback analyzer 154 can progressively modify subsequent queries to maximize relevance while minimizing the number of iterations. The analyzer 154 may strengthen the relevance of images with similar features while weakening the relevance of images with dissimilar features.

The new relevance-feedback and query-refinement techniques described herein may be implemented as part of the feature and semantic matcher 152 and/or the feedback analyzer 154.

Accordingly, the image retrieval system seamlessly integrates semantic and feature-based relevance feedback CBIR. The system yields tremendous advantages in terms of both retrieval accuracy and ease of use.

Image Retrieval System Architecture

Figure 2:
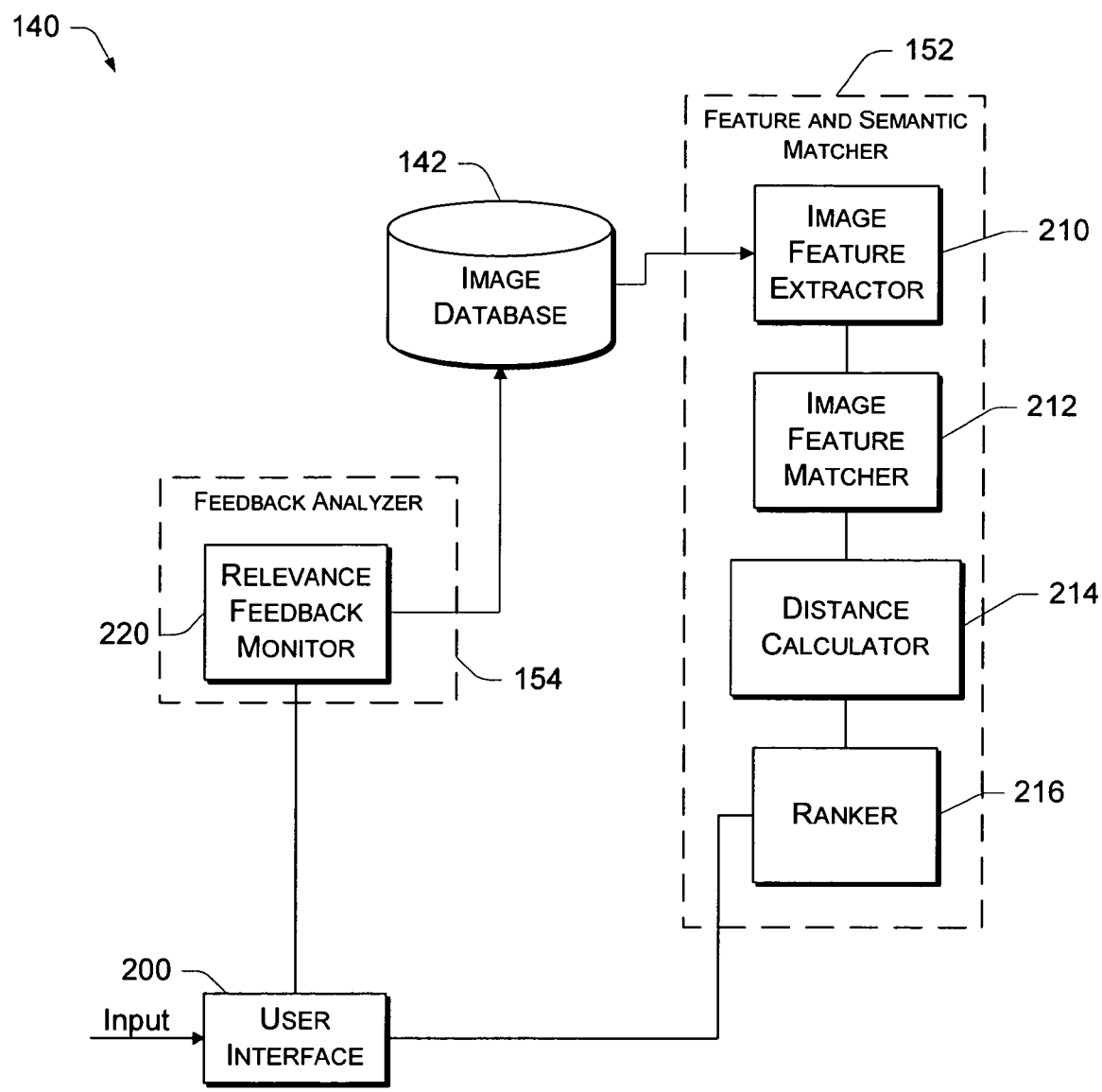
FIG. 2 is a block diagram of an image retrieval system architecture in accordance with an implementation of the claimed invention.

FIG. 2 illustrates the image retrieval system architecture 140 in more detail. It has a user interface (UI) 200 that accepts a selection of example images. The UI 200 provides navigation tools to allow the user to browse through multiple images. In the FIG. 1 network system, the UI 200 can be served as an HTML document and rendered on the client display.

With UI 200, the user may select an example image from a set of sample images. To accomplish this, the user interface 200 initially presents a set of image categories from which the user may choose. Upon selection of a category, the image retrieval system returns a sample set of images pertaining to the category.

The feature and semantic matcher 152 identify images in image database 142 that contain low-level features resembling the example image. The feature and semantic matcher 152 includes an image feature extractor 210 that extracts low-level features from the candidate images in the image database 142. Such low-level features include color histogram, texture, shape, and so forth. The feature extractor 210 passes the features to an image feature matcher 212 to match the low-level features of the candidate images with the low-level features of the example image submitted by the user. Candidate images with more similar features are assigned a higher rank.

A distance calculator 214 calculates similarity distances between the feedback images and the candidate images. See section entitled "Query Refinement Techniques for Relevance Feedback of Image Retrieval" below for more information on this.

A ranking module 216 ranks the images such that the highest-ranking images are returned to the user as the preferred results set. The ranking takes into account the closeness in features between two images. The set of highest-ranked images are returned to the user interface 200 and presented to the user for consideration.

The user interface 200 allows the user to mark images as more or less relevant, or entirely irrelevant. The feedback analyzer 154 monitors this user feedback. A relevance feedback monitor 220 tracks the feedback and performs low-level feature relevance feedback. Generally, the relevance feedback monitor 220 uses query point movement (of the implementations of the exemplary RFCBIR) to improve the feature-based retrieval model.

Particular implementations of the exemplary RFCBIR are described below in more detail under the headings "Bayesian Classifier in Relevance Feedback for Image Retrieval" and "Query Refinement Techniques for Relevance Feedback of Image Retrieval." These implementations may be employed by the feature and semantic matcher 152 and/or the feedback analyzer 154.

Bayesian Classifier in Relevance Feedback of Image Retrieval

One implementation of the exemplary RFCBIR employs a Bayesian classifier to progressively improve the relevance of the results of subsequent queries. Bayesian classifiers are known to those of ordinary skill in the art.

With this implementation, the probabilistic property of each image is used in the relevance feedback process. This property contains the conditional probability of each attribute value given the image and can be updated on the fly by users' feedback. It describes a single decision boundary through the features space.

The conventional techniques treat positive and negative examples in the feedback (i.e., feedback images) the same in the query refinement process. This is shown in Formula 1 in the Background section above. This conventional approach produces less relevant results than the approach of this implementation of the exemplary RFCBIR, described herein. In this new approach, positive and negative feedback images are treated differently in the query refinement process.

Bayesian Classifier

Consider vector x in $R^n$ that obeys Gaussian distribution; then, the probability density function of x is:

$$p(x) = \frac{1}{(2\pi)^{d/2}|\Sigma|^{1/2}} e^{-\frac{1}{2}(x-\varepsilon)^T \Sigma^{-1}(x-\varepsilon)} \quad (2)$$

where $x=[x_1, \ldots, x_n]$, $\varepsilon=[\epsilon(x_1), \ldots, \epsilon(x_n)]$, and $\Sigma=\epsilon\{(x-u)(x-u)^T\}$.

The following Bayesian decision boundary function is the probability of x belonging to the $i^{th}$ class $w_i$:

$$g_i(x) = lgP_i(x) = -\frac{1}{2}(x-\varepsilon_i)^T \sum_i^{-1}(x-\varepsilon_i) \quad (3)$$

$$-\frac{d}{2}\ln 2\pi - \frac{1}{2}\ln|\Sigma_i| + \ln P(w_i)$$

Positive Feedback

With this implementation of the exemplary RFCBIR, the Bayesian classifier is employed by the feedback process. Each image belongs to an unknown semantic class. In this implementation, sample-based image retrieval is employed. That is, a user provides an example image as a query and the image retrieval system retrieves similar images in the image database.

It is highly unlikely that the low-level feature of the example image is just at the distribution center of a semantic class of images. The exemplary RFCBIR constructs a Bayesian classifier for query image by its positive examples. The parameter of this classifier can be considered as the real query of this image and could be updated by more feedbacks. Hence, the exemplary RFCBIR employs both a query refinement and a weight updating process.

Each image $P_k$ can be represented by a vector $\vec{x}_k = [\vec{x}_{ki1}, \ldots, \vec{x}_{km}]$ in the feature space where $\vec{x}_{ki} = [x_{ki1}, \ldots, x_{kin_i}]$. For each feature vector $\vec{x}_{ki}$, there is a $n_{ni} \times n_i$ dimension covariance matrix $\Sigma_{ki}$ and an n dimension mean vector $\epsilon_{ki}$ to describe their query vector. $n_k$ is the number of positive feedbacks to image $P_k$. Since the inter-feature covariance is not considered, the diagonal matrix diag$\{\sigma_{ki}\}$ is used instead, where $\sigma_{ki}(m)=\Sigma_{ki}(m,m)$. This is because the inter-feature correlation cannot be estimated accurately and reliably, especially when there are not enough feedbacks.

This implementation of the exemplary RFCBIR handles positive feedbacks in this manner:

Feature Normalization: This puts equal emphasis on each component. For $\vec{x}_{ki}$ the normalized vector is $\vec{x}'_{ki}=[x_{ki1}, \ldots, x_{kin_i}]$, where $$x'_{ki_m} = \frac{x''_{ki_m} - \varepsilon(x''_{ki_m})}{3\sigma(x''_{ki_m})} \text{ and } x''_{ki_m} = \frac{x''_{ki_m} - \min(X_{ki_m})}{\max(X_{ki_m}) - \min(X_{ki_m})}.$$

If $x_{ki_m}$ satisfies the Gaussian distribution, it is easy to prove that the probability of $x'_{ki_m}$ being in the range of $[-1,1]$ is 99%.

Initialization: Initialize $\sigma_{ki}$ to be null and let $\epsilon_{ki} = \vec{x}_{ki}$, $n_k=1$.

Feedback and Update Parameters: In each cycle of $P_k$;s retrieval process, suppose there is a positive example set $C_p=\{P_{p1} \ldots P_{pq}\}$: according to Equation 3 the following is the resulting update procedure:

$$\sigma_{ki}^2 = n_k \sigma_{ki}^2 + \frac{n_k q \varepsilon_{k_i}^2 2n_k \varepsilon_{k_i} \Sigma P_{Pi}}{n_k + q} + \Sigma P_{Pi}^2 - \frac{\left(\sum P_{Pi}\right)^2}{n_k + q},$$

$$\varepsilon_{ki} = \frac{n_k \times \varepsilon_{ki} + \text{sum}(C_p)}{n_k + q},$$

$$n_k = n_k + q.$$

Distance Calculation: For each image $P_i$ in the database, its distance $d_{i,k}$ is calculated to the example image $P_k$ using Equation 3 in the retrieval after the feedback. $d_{i,k}=-g_k(P_i)$ That is, the similarity of each image in the database to be refined query is determined by Equation 3 based on the positive examples.

Sorting by distance if there is no negative feedback.

Negative Feedback

Conventional techniques use the same technique to handle negative and positive feedbacks. However, with the exemplary RFCBIR, they are treated differently. Positive examples are usually considered to belong to the same semantic class and there are well agreed-upon understandings. On the other hand, negative examples are often not semantically related. Typically, negative examples are often isolated and independent. Therefore, the inventors of this present invention recognized an advantage to treat positive and negative examples differently.

In an implementation of the exemplary RFCBIR, the negative examples are handled in this manner. Suppose that there is a set of negative feedbacks, $C_N=\{P_{N1} \ldots P_{NI}\}$, for image $P_k$. For each element in $C_N$, a 'dibbling' process is applied in calculated the similarity distance of each database images in the refined retrieval. That is, images that are near the negative examples are penalized by increasing similarity distance $d_{i,k}$ as defined in Equation 4 below.

With this strategy, there will be a peak in similarity distance at each negative example. By extensive simulation, it was determined that the function can be well approximated by the combination of a series of Gaussian function:

$$d_{i,k} = d_{i,k} + \Sigma_{i=1}^l (p_{P_{nj}}(P_i) \times d_{k,ni}) \quad (4)$$

where $p_{P_{nj}}(x)$ is defined in Equation 2 with $\epsilon=P_{ni}$, $\Sigma=I$.

In this way, images in the database that are clause to the negative examples are pushed away from being selected into the processing retrieved image list.

Other Point Movement Strategies Employing a Bayesian Method

As motioned in the Background section above, some conventional implementations of point movement strategy use a Bayesian method. Specifically, these include Cox et al. and Vasconcelos/Lippman.

In these conventional works, they consider the feedback examples to the same query to be independent with each other. They do this so that they can use Naive Bayesian Inference to optimize the retrieval results by using feedback examples.

In contrast to these conventional works, the exemplary RFCBIR treat all positive examples to be closely related with each other. The exemplary RFCBIR uses these positive examples of the same query to construct a Bayesian classifier and use that classifier to represent the original query and try to get more accurate retrieval results.

Unlike these conventional works, the exemplary RFCBIR is incremental. The user's previous feedback information is stored in the parameters of the classifier and is used. This information is updated by the latter feedback so that less iterations of feedback are necessary and high accuracy can be achieved.

Query Refinement Techniques for Relevance Feedback of Image Retrieval

The ability for an image retrieval system to effectively use user feedbacks is the key to providing accurate retrieval results. The conventional method of utilizing this information is to construct the ideal query vector using a weighted feature sum (WFS) of the positive feedbacks (discussed above in the Background section).

There are several shortcomings associated with this conventional approach. First, the user has to provide the degree of relevance associated with each feedback. This step is tedious and inaccurate as the users themselves are uncertain about the degree of relevance when it is expressed in numerical values. Furthermore, as the feedback process cycles, it is hard to guarantee the convergence of the estimated ideal query vectors. As a result, retrieval performance may not improve with increasing numbers of feedback cycles.

Described here are implementations of the exemplary RFCBIR that employ query refinement techniques that eliminate these problems. The main problem of all feedback systems is how to evaluate the similarity between images in database and feedback images more accurately. These implementations include new techniques for calculating the distance of an image to a group of images and present our query refinement framework based on them.

For the following descriptions of implementations of the exemplary RFCBIR, assume an image database D consists of M images. In one feedback iteration, the user provides $N_R$ relevant and $N_N$ irrelevant images respectively. $X_i^+$, i=1, ..., $N_R$ is defined as the $i^{th}$ positive feedback image, and $X_i^-$, i=1, ..., $N_N$ is defined as the $i^{th}$ negative feedback image.

Implementation Employing the Weighted Distance Sum (WDS) Technique

The WFS method does not work well in common image retrieval systems because the weighted feature sum is not meaningful if the feedback images representing multiple different concepts. Hence, the similarity between the $j^{th}$ image in database and the average feature will never reflect the real distance between j and feedback images.

This implementation employs the Weighted Distance Sum (WDS) technique. This technique uses the weighted similarity distances between $j^{th}$ image in database and feedback images as the distance between them. The similarity evaluation is given by $$Dis(j) = \sum_{i=0}^{N_R} w_i * (1 - Sim(j, X_i^+)) \quad (5)$$

where $w_i$ is the normalized weight of each feedback images specified by user. $Sim(j,X_i^+)$ is the similarity between image j and $X_i^+$ in low-level features, where $0 \leq Sim(j,X_i^+) \leq 1$. The larger the value is, the more similar these two images would be.

Implementation Employing the Minimal Distance (MD) Technique

In many cases, the set of user's feedbacks have similar semantic meanings, but may differ greatly in feature space. Most often, the user is only interested in an object or a region contained in the feedback images. The conventional method of estimation of the ideal query parameter as the weighted sum of the feature vectors of the feedback images does not consider this. Instead, it simply averages all components of the feature vectors by the user-assigned degree of relevance for each feedback images.

In each feedback iteration, users often pay attention to the semantic content. But those positive feedback images selected by the users may be different in each low-level feature. In fact, the negative feedback images are always dissimilar in both semantic and low-level features. Hence, any attempt to average the distances or the features of feedback images is not suitable to some extent.

This implementation employs the Minimal Distance (MD) technique. This technique uses the nearest neighbor method to define the distance between $j^{th}$ image in database and those positive feedback images.

$$Dis(j)=Min\{(1-Sim(j,X_i^+))|i=1, \ldots ,N_R\} \quad (6)$$

From Equation 6, it can be seen that, if the feedback images have large variance in low-level features, the most similar images to each of them are found. Therefore, any feedback image will be treated as a single query and the images retrieved are those similar enough to any one of them.

Implementation Employing the Minimal Distance Rank (MDR) Technique

An important assumption behind the MD technique is that images in the database are evenly distributed in both semantic and feature space. If this assumption is not valid, then the resulting retrieval favors only a subset of the positive feedback images (rather than all of such images). One solution to this problem is to consider the minimum relative ranking of each image in the database with respect to the positive feedbacks. Thus, this implementation employs the minimal distance rank (MDR) technique to overcome this situation by using relative ranks.

First, $Sim(j,X_i^+)$, j∈M is calculated, which is the similarity between $i^{th}$ feedback images and all images in database. After that, this similarity is used to get the rank of images j correspond to $i^{th}$ positive feedback image $X_i^+$ using Equation 7.

$$R(j,X_i^+)=\text{Rank}\{(1-\text{Sim}(j,X_i^+))|j \epsilon M\} \quad (7)$$

where $R(j,X_i^+)$ is the rank of image j to $i^{th}$ positive feedback image $X_i^+$, with the smallest rank meaning the most similar.

After determining all the images' ranks to each individual positive images, the final rank of image j to all positive feedback images is given by Equation 8 based on which the system sorts the retrieval result.

$$R(j,X_i^+)=\text{Min}\{R(j,X_i^+)|i=1,\ldots,N_R\} \quad (8)$$

Of these three query-refinement techniques described above, the MDR technique typically produces better results than the WDS or the MD techniques. Thus, the MDR technique is favored.

Hybrid Implementations

Other implementations of the exemplary RFCBIR may include any reasonable combination of the above techniques. Specifically, other implementations may include any reasonable combination of the Bayesian classifier technique, the WDS technique, the MD technique, or the MDR technique.

Relevance Feedback Integration

An exemplary image retrieval system framework may be formed by combining the MDR and MD techniques. Given a group of positive feedback images $X_i^+, i=1,\ldots,N_R$ and negative feedback images $X_i^-, i=1,\ldots,N_N$ in certain feedback iteration, the exemplary RFCBIR first use the MD method to calculate the distance between image j in database and all negative feedback images.

$$\text{Dis}(j)=\text{Min}\{(1-\text{Sim}(j,X_i^-))|i=1,\ldots,N_N\} \quad (9)$$

The exemplary RFCBIR uses $X_{j,k}^-, k=1,\ldots,N_N$ to indicate the negative feedback image corresponding to image j with Eq. (9). The exemplary RFCBIR then uses Eq. (10) to calculate the distance between the $j^{th}$ image and positive feedback image $X_i^+$.

$$\text{Dis}(j,X_i^+)=2.0-\text{Sim}(j,X_i^+)*\{\text{Dis}(j)+\text{Sim}(X_i^+,X_{j,k}^-)\} \quad (10)$$

In equation 10, The exemplary RFCBIR integrates both positive and negative similarity to get an overall distance of image j in the current feedback iteration. The exemplary RFCBIR multiply similarity $\text{Sim}(X_i^+, X_{j,k}^-)$ with $\text{Sim}(j,X_i^+)$ to indicate that, the more similar $X_i^+$ and $X_{j,k}^-$ is, the more weight should be add to the similarity $\text{Sim}(j,X_i^+)$. It is quite often that the user marks two images which are very similar in low-level features as positive and negative respectively. This strategy can prevent most of images that are both similar to positive and negative images from being ranked too bad.

The exemplary RFCBIR uses the distance in Eq. (10) to get the rank of image j in database to each positive feedback image $X_i^+$, as defined in Eq. (11). After the exemplary RFCBIR gets every image's rank to all positive feedback images, the exemplary RFCBIR uses MDR method defined in Eq. (8) to find the minimal rank of image j and get the final retrieval results.

$$R(j,X_i^+)=\text{Rank}\{\text{Dis}(j,X_i^+)|j \epsilon M\} \quad (11)$$

Methodological Implementation of the Exemplary RFCBIR

Figure 3:
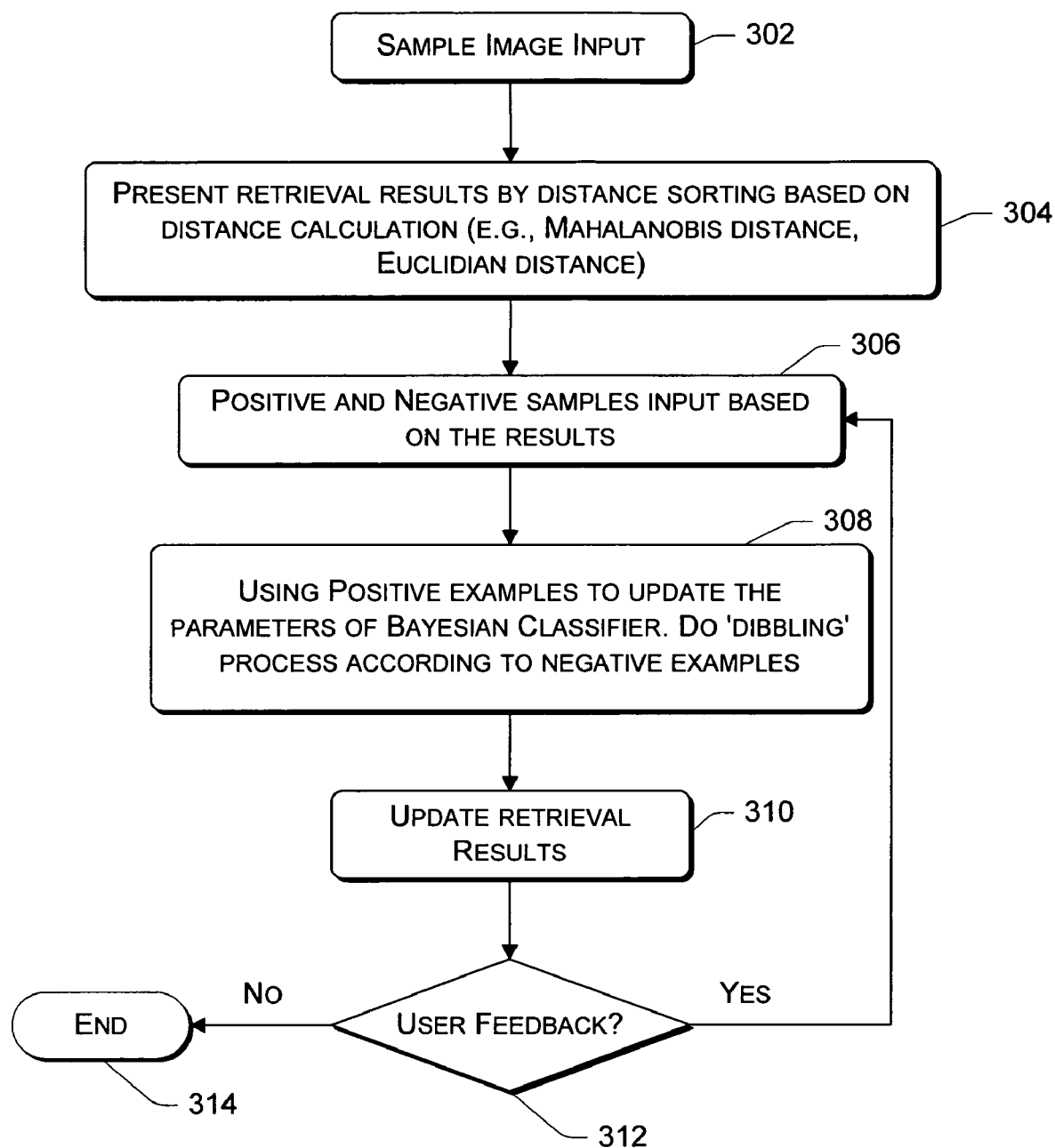
FIG. 3 is a flow diagram showing a methodological implementation of the invention claimed herein.
Figure 4:
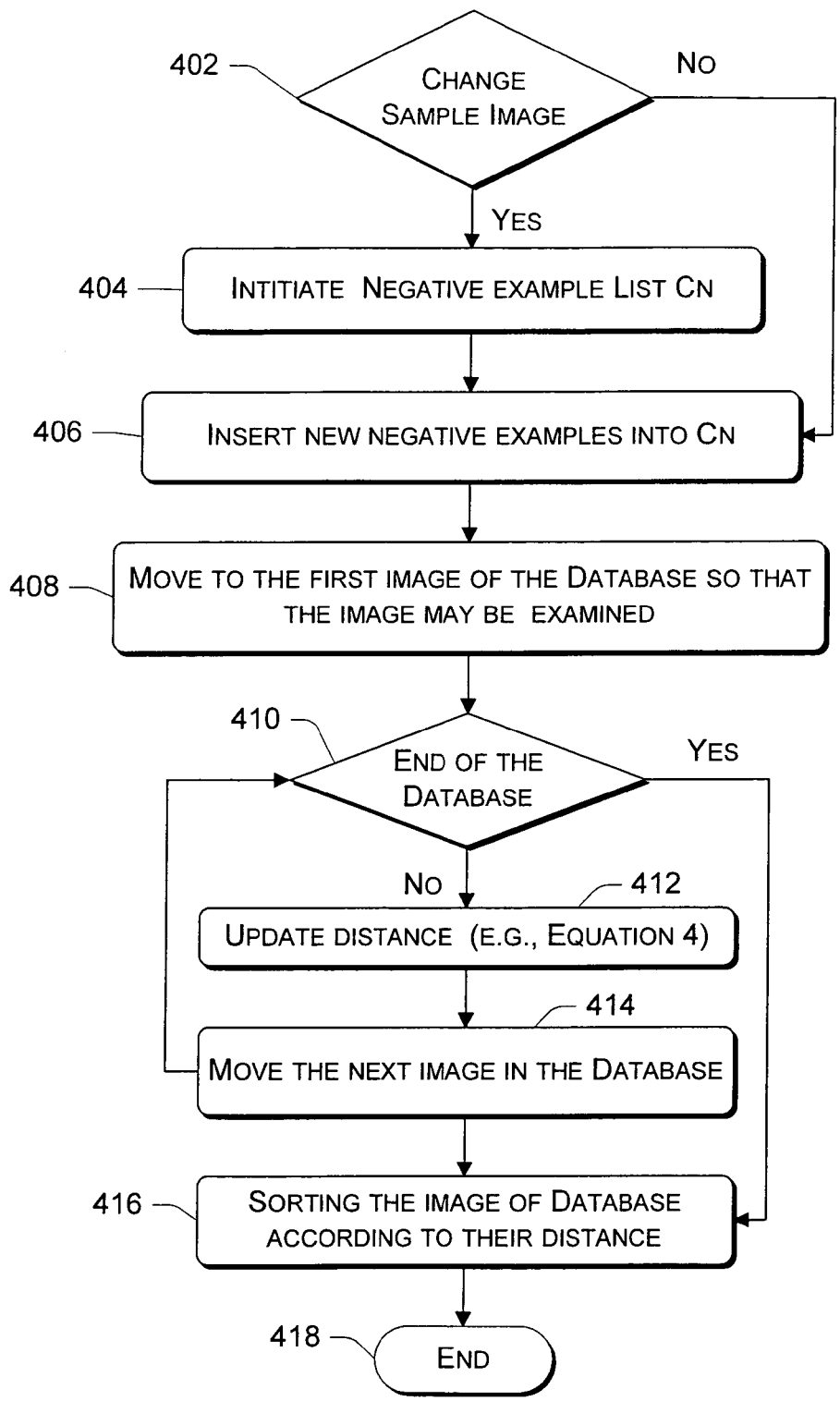
FIG. 4 is a flow diagram showing a methodological implementation of the invention claimed herein.

FIGS. 3 and 4 show methodological implementations of the exemplary RFCBIR performed by the RFCBIR system (or some portion thereof). These methodological implementations may be performed in software, hardware, or a combination thereof.

FIG. 3 shows the retrieval process of the exemplary RFCBIR. At 302, a sample image is inputted into the RFCBIR system. For example, a user a may select one or more images displayed by UI 200 of system 140 of FIG. 2.

At 304, the user is presented with retrieval results by distance sorting based upon a distance calculation (in accordance with equations such as equation 6 of the MD technique or equation 5 of the WDS technique). For the distance calculation here, any standard type of of distance matrix (e.g., measurement) may be employed. For example, it may be Mahalanobis distance, Euclidian distance, etc. At 306, the positive and negative feedback examples are inputted based upon the results.

At 308, the positive examples are used to update the parameters of Bayesian classifier and the 'dibbling' process is performed according to the negative examples. Next, at 310, the retrieval results are updated and presented to the user. At 312, the user decides if the user is satisfied with the relevancy of the retrieval results. If so, then the user provides no feedback and the process ends at 314. If not, then the user provides feedback. The process returns to block 306 and blocks 306–312 are repeated based upon the new user feedback. This loop continues until the user provides no feedback.

FIG. 4 shows the negative feedback process of the exemplary RFCBIR. At 402, it is determined whether the sample image has changed. If not, then the process skips block 404 and proceeds to block 406 where the new negative examples are inserted in the list list ($C_n$). If the sample image has changed, then the negative example list ($C_n$) is initiated at 404. Then the process proceeds to block 406.

At 408, start examining the first image of the database (such as database 142 of FIGS. 1 and 2). At 410, determine if this is the last image in the database. If so, then the process ends at 418. Of course, if there is only one image in the database, then no sorting is necessary.

If the image is not last in the database, then, at 412, update the distance metric of that image by using equation 4 of Negative Feedback technique. At 414, move to the next image in the database and the process returns to decision block 410 where it is determined whether this image is the last. If it is, then the process jumps to block 414 where the images of the database are sorted according to their distance.

Data Flow of a Methodological Implementation of the Exemplary RFCBIR

Figure 5:
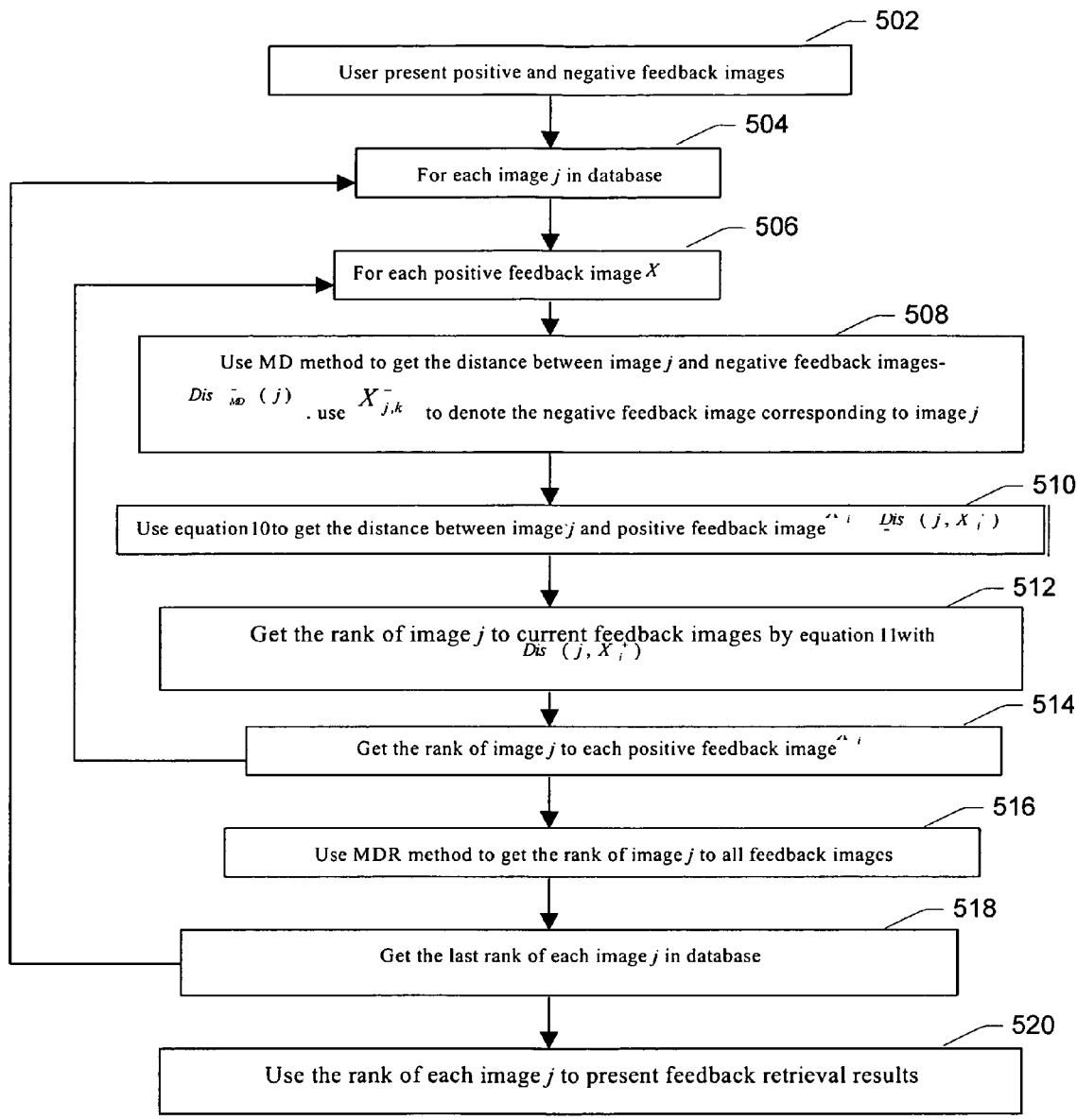
FIG. 5 is a flow diagram showing a methodological implementation of the invention claimed herein.

FIG. 5 shows a data flow of a methodological implementation of the exemplary RFCBIR performed by the RFCBIR system (or some portion thereof).

FIG. 5 shows the data flow of the query refinement process of the exemplary RFCBIR. At 502, the user provides both positive and negative feedback images. Blocks 504 through 518 form a loop that is repeated for each image (i) in the image database. Similarly, blocks 506 through 514 form a loop that is repeated for each positive feedback image.

At 508, the MD technique is employed to get the distance between the image being currently examined (j) and negative feedback images. At 510, using equation 10 of Relevance Feedback Integration, the distances between image j and current positive feedback image ($X_i^+$) is calculated. At 512, using equation 11 of Relevance Feedback Integration, the rank of image j to the current feedback images determined. At 514, get the rank of image j to each positive feedback image $X_i^+$ and return to block 506 if more positive feedback images exist.

At 516, use the MDR technique to get the rank of image j to all feedback images. At 518, get the last rank of each image j in the database and return to block 504 if more images exist in the database. At 520, the feedback retrieval results are presented to the user with the images displayed in order of rank.

Exemplary Computing System and Environment

FIG. 6 illustrates an example of a suitable computing environment 900 within which an exemplary RFCBIR, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary RFCBIR may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary RFCBIR may be described in the general context of computer-executable instructions, such as program modules, being executed by a computer. Generally, program modules include routines, programs, objects, components, data structures, etc. that perform particular tasks or implement particular abstract data types. The exemplary RFCBIR may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 6 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of relevance feedback sub-system and feedback analyzer.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary RFCBIR may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 6 illustrates an example of a suitable operating environment 900 in which an exemplary RFCBIR may be implemented. Specifically, the exemplary RFCBIR(s) described herein may be implemented (wholly or in part) by any program modules 928–930 and/or operating system 926 in FIG. 6 or a portion thereof.

The operating environment is only an example of a suitable operating environment and is not intended to suggest any limitation as to the scope or use of functionality of the exemplary RFCBIR(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general-and special-purpose appliances, application-specific integrated circuits (ASICs), network PCs, minicomputers, mainframe computers, distributed computing environments that include any of the above systems or devices, and the like.

Computer Readable Media

An implementation of an exemplary RFCBIR may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable media having computer-executable instructions that, when executed by a computer, perform a method for improving iterative results of Content-Based Image Retrieval (CBIR) using relevance feedback, the method comprising:

obtaining a set of positive feedback images and a set of negative feedback images via relevance feedback, the set of positive feedback images are those images deemed semantically relevant and the set of negative feedback images are those deemed semantically less relevant;

constructing a Bayesian classifier of a positive feedback image by positive candidate images;

within a feature space, moving a positive candidate image towards the set of positive feedback images by adjusting distance metrics of the positive candidate image, the positive candidate image having similar low-level features as those of the set of positive feedback images, wherein the adjusting of distance metrics of the positive candidate image employs this evaluation:

$$Dis(j) = \sum_{i=0}^{N_R} w_i * (1 - Sim(j, X_i^+));$$

where j is the positive candidate image;

$N_R$ is a number of images in the set of positive feedback images;

$X_i^+$, i=1, . . . , $N_R$ is defined as the $i^{th}$ image;

$w_i$ is the normalized weight of the images in the set of positive feedback images;

within a feature space, distancing a negative candidate image from the set of positive feedback images by adjusting distance metrics of the negative candidate image, the negative candidate image having similar low-level features as those of the set of negative feedback images.

2. One or more media as recited in claim 1 further comprising employing a Bayesian decision boundary function to determine the probability of an image being a positive candidate image.

3. One or more media as recited in claim 1, wherein the moving further comprises:

normalizing features of an image within a feature space;

initializing parameters of the classifier;

updating the parameters using the features of the new positive feedback images;

calculating distances based upon a Bayesian decision boundary function;

sorting images based upon calculated distances, wherein the sort is performed as if no negative feedback images exist.

4. One or more computer-readable media having computer-executable instructions that, when executed by a computer, perform a method for improving the evaluation of the similarity of images based upon image features, the method comprising defining a subject image to be similar to a set of example images because it is within a minimal distance of the set of example images within a feature space, wherein the distance between the subject image and the set of example images is calculated based upon this evaluation:

$$Dis(j) = \sum_{i=0}^{N_R} w_i * (1 - Sim(j, X_i^+));$$

where j is the subject image;

$N_R$ is a number of images in the set of example images;

$X_i^+$, i=1, . . . , $N_R$ is defined as the $i^{th}$ image;

$w_i$ is the normalized weight of the images in the set of example images;

repeating the defining for each example image in a set of example images and for each subject image in a set of subject images.

5. One or more media as recited in claim 4 further comprising ranking similarly of each subject image in the set of subject images to each example image in the set of example images.

6. A system for improving iterative results of Content-Based Image Retrieval (CBIR) using relevance feedback, the system comprising:

a relevance feedback means for obtaining a set of positive feedback images and a set of negative feedback images via relevance feedback, the set of positive feedback images are those images deemed semantically relevant and the set of negative feedback images are those deemed semantically less relevant;

a feedback analyzing means for performing functions within a feature space, the functions comprising:

moving a positive candidate image towards the set of positive feedback images by adjusting distance metrics of the positive candidate image, the positive candidate image having similar low-level features as those of the set of positive feedback images, wherein the adjusting of distance metrics of the positive candidate image employs this evaluation:

$$Dis(j) = \sum_{i=0}^{N_R} w_i * (1 - Sim(j, X_i^+));$$

where j is the positive candidate image;

$N_R$ is a number of images in the set of positive feedback images;

$X_i^+$, i=1, . . . , $N_R$ is defined as the $i^{th}$ image;

$w_i$ is the normalized weight of the images in the set of positive feedback images;

distancing a negative candidate image from the set of positive feedback images by adjusting distance metrics of the negative candidate image, the negative candidate image having similar low-level features as those of the set of negative feedback images.

7. A system as recited in claim 6, wherein the feedback analyzing means is also for constructing a Bayesian classifier of a positive feedback image by positive candidate images.

8. A system as recited in claim 6, wherein the feedback analyzing means is also for defining a subject image to be similar to an example image because it is within a minimal distance of the example image within a feature space.

* * * * *